March 3, 1931.                C. D. MAYSENT                1,794,720
                            HARVESTER ATTACHMENT
                             Filed Jan. 4, 1930

C.D. Maysent
Inventor

Patented Mar. 3, 1931

1,794,720

UNITED STATES PATENT OFFICE

CHARLES D. MAYSENT, OF KIRKMAN, IOWA

HARVESTER ATTACHMENT

Application filed January 4, 1930. Serial No. 418,609.

This invention relates to an attachment designed for use on harvesters or binders, the primary object of the invention being to provide novel means whereby the reel, sickle bar and bundle tying needle may be adjusted simultaneously.

An important object of the invention is to provide a device of this character wherein the normal position of the reel, sickle bar and needle may be adjusted to meet various requirements.

A still further object of the invention is to provide an attachment of this character which may be readily installed on harvesting machines or binders of the usual and well known construction, eliminating the necessity of making alterations in the construction of the machine to position the device.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

The figure illustrates a side elevational view of an attachment constructed in accordance with the invention, one end of the tractor and harvester being shown.

Referring to the drawing in detail, a portion of the harvesting machine or binder is indicated generally by the reference character 5, and includes a bar 6 to which the downwardly curved casting 7 is secured, and to which the tongue 8 is pivotally connected, the tongue being provided with a clevis 9 at its forward end, by means of which the harvester or binder is hitched to the tractor, which is indicated generally by the reference character 10.

The attachment comprises an upright 11 that has its lower end bolted to the side of the tongue 8, adjacent to one end thereof, there being provided a brace bar 13 disposed at an oblique angle with respect to the upright 11 and secured to the upright 11 and tongue 8 to hold the upright against movement. A horizontal brace bar 14 connects the bar 13 and upright 11 to further insure a rigid construction.

The bearing 15 is secured to the brace bar 13 and supports the bar 16 by means of the bolt 17 that extends through the bar 16. At the lower end of the bar 16, is a bar 18 which has pivotal connection with the bar 16 at 19, the bar 18 having a right angled end portion 20 formed with an opening to receive the rod 21 which has a right angled end portion to be fitted in one of the openings 22, formed in the bar 18, so that the throw of the rod 21 may be adjusted.

This rod 21 has pivotal connection with the arm 23 that is secured to the pinion 24 to move therewith, the pinion 24 being mounted on the shaft 25 that is supported in the bearing 26 secured to the tongue 8. Secured to the bearing 26 is an arm 27 formed with an opening 28 in which the lower end of the controlling rod 29 operates, the rod 29 being provided with a worm 30 meshing with the pinion 24 so that rotary movement of the controlling rod 29 will result in a relative rotary movement of the pinion 24 to move the arm 23 and members connected therewith.

Pivotally connected with the arm 23, is a rod 31 that has pivotal connection with the lever 32, at 33, the lever being provided with a sliding bolt to engage the rack 34, so that the lever 32 may be moved to various positions of adjustment, to the end that the initial position of the rod 31 may be changed to meet various requirements.

The reference character 35 designates a rod that extends through the right angled end 36 of the bar 37, one end of the rod 35 being positioned in one of the openings 38 of the bar 37, so that the length of the rod 35 may be adjusted. As shown, the bar 37 has pivotal connection with the bar 16, and may be adjusted with respect to the end of the bar 16, by positioning the connecting bolt 39 in any one of the openings 40 of the bar 16.

As shown, the rod 35 has pivotal connection with the triangular supporting frame 41, at 42, the frame being pivotally connected to the upright 43, at 44.

The binder reel is indicated by the reference character 45, and operates on the shaft 46 mounted in a bearing at the upper end of the arm 47, which arm has pivotal connection with the frame 41, at 48.

The reference character 49 designates a handle which is secured to the outer end of the controlling rod 29, the same being positioned so that the operator standing on the platform 50, may have easy access thereto. Thus it will be seen that by rotating the controlling rod 29, the reel 45 may be raised or lowered so that it will properly contact with the wheat being harvested, to draw the wheat into the sickle blade of the harvester.

The normal operating position of the reel 45 is adjusted by moving the lever 51 to which the rod 52 is connected, the rod 52 being adjustably connected with the bar 53 that in turn has pivotal connection with the bar 47.

The bundle tying needle is indicated by the reference character 54, and is of the usual and well known construction, the same being adjustable so that long or short bundles may be properly tied.

The adjustment of the bundle tying needle is accomplished simultaneously with the adjusting of the reel 45, the adjustment being made by the action of the rod 55 which is connected with the bar 56, that in turn has pivotal connection with the bar 16, the bar 56 being adjustable along the bar 16, by means of the pin 57 which may be inserted in the openings 58 of the bar 16. One end of the rod 55 connects with the curved arm 59 pivotally mounted on the uprights 43, at 60.

An arm 61 is connected with the arm 59, the arm 61 being connected to the rod 62 which in turn has pivotal connection with the needle adjusting bar 63, at 64. Thus it will be obvious that as the rod 29 is rotated, the reel 45 will be adjusted vertically, and the bundle tying needle will also be adjusted simultaneously, eliminating the necessity of the operator making two adjustments, and consequently reducing the work of the operator, to the minimum.

The coiled spring 65 connects with the rod 66, which has connection with the triangular frame 41, through the medium of the bracket 67, the opposite end of the coiled spring being anchored to the frame at 68. This coiled spring holds the frame 41 under tension so that the proper adjustment may be made. The coiled spring 69 has one of its ends adjustably connected with the pinion 24, while the opposite end thereof is anchored at 70, so that movement of the pinion 24 will be under tension.

Thus it will be obvious that when an adjustment is being made, the reel 45 moves vertically at a greater rate of speed than the platform and sickle blade of the machine, because the arm 23 must make a quarter turn before it passes the dead center and raises the platform, with the result that an adjustment may be made to cut tall or short grain, and the platform of the machine maintained substantially level.

I claim:

1. In a harvesting machine, a vertically adjustable reel on the machine, an adjustable bundle tying needle on the machine, means for adjusting the reel and needle simultaneously, and means for adjusting the reel and needle independently of each other.

2. In a harvesting machine, a main frame, a pivoted frame on the main frame, bars pivotally connected to the pivoted frame, a reel supported by the bars, a pivoted bar, means for connecting the pivoted bar and pivoted frame, an adjustable tying needle mounted on the main frame, means for transmitting movement of the pivoted bar to the needle, and means for operating the pivoted bar to adjust the reel and needle simultaneously.

3. In a harvesting machine, a vertically adjustable reel forming a part of the harvester, a bundle tying needle, a pivoted bar, adjustable members for transmitting movement of the pivoted bar to the reel and needle to adjust the reel and needle simultaneously, and means for adjusting the throw of the pivoted bar.

4. In a harvesting machine, a main frame, a pivoted frame mounted on the main frame, a reel mounted on the pivoted frame, a bundle typing needle mounted on the frame, a pivoted bar, adjustable means for connecting the bar and pivoted frame, adjustable means for transmitting movement of the bar to the needle, a pinion on the main frame, an arm extending from the pinion to move therewith, an adjustable member connecting the arm and pivoted bar to operate the pivoted bar, means for imparting rotary movement to the pinion, and means for adjusting the throw of the arm.

In testimony that I claim the foregoing as my own, I have hereto affixed my signature.

CHARLES D. MAYSENT.